US011520944B2

(12) United States Patent
Allen et al.

(10) Patent No.: US 11,520,944 B2
(45) Date of Patent: Dec. 6, 2022

(54) SYSTEM AND METHOD FOR MODELING OF PARTS WITH LATTICE STRUCTURES (71) Applicant: Siemens Industry Software Inc., Plano, TX (US)

(72) Inventors: George Allen, Okinawa (JP); Nurcan Gecer Ulu, Pittsburgh, PA (US); Louis Komzsik, Huntington Beach, CA (US); Lucia Mirabella, Plainsboro, NJ (US); Suraj Ravi Musuvathy, Princeton, NJ (US)

(73) Assignee: Siemens Industry Software Inc., Plano, TX (US)

( * ) Notice: Subject to any disclaimer, the term of this patent is extended or adjusted under 35 U.S.C. 154(b) by 428 days.

(21) Appl. No.: 15/776,948

(22) PCT Filed: Nov. 25, 2015

(86) PCT No.: PCT/CN2015/095572
§ 371 (c)(1),
(2) Date: May 17, 2018

(87) PCT Pub. No.: WO2017/088134
PCT Pub. Date: Jun. 1, 2017

(65) Prior Publication Data
US 2018/0365342 A1 Dec. 20, 2018

(51) Int. Cl.
*G06F 30/00* (2020.01)
*B33Y 50/00* (2015.01)
*G06F 119/18* (2020.01)

(52) U.S. Cl.
CPC .............. *G06F 30/00* (2020.01); *B33Y 50/00* (2014.12); *G06F 2119/18* (2020.01); *Y02P 90/02* (2015.11)

(58) Field of Classification Search
CPC ..... G06F 30/00; G06F 2119/18; B33Y 50/00; Y02P 90/265
(Continued)

(56) References Cited

U.S. PATENT DOCUMENTS 6,096,088 A       8/2000  Yu et al.
10,078,912 B1 *   9/2018  Kanthasamy ......... G06T 15/503
(Continued)

FOREIGN PATENT DOCUMENTS

CN     1251186 A     4/2000
CN   101071451 A    11/2007
(Continued)

OTHER PUBLICATIONS

Kraus et al., "Investigations on the polygonal finite element method: Constrained adaptive Delaunay tessellation and conformal interpolants", 2013. (Year: 2013).*
(Continued)

*Primary Examiner* — Brian S Cook
(74) *Attorney, Agent, or Firm* — Lempia Summerfield Katz LLC (57) ABSTRACT Methods for modeling of parts with lattice structures and corresponding systems and computer-readable mediums. A method includes receiving a model of an object to be manufactured. The method includes receiving a user specification of a void region within the model to create a lattice. The method includes performing a trimming operation to create a trimmed lattice by tessellating void surfaces and grouping together at least one row of connected rods to be treated as a single entity.

16 Claims, 5 Drawing Sheets (58) Field of Classification Search
USPC .......................................................... 703/1
See application file for complete search history.

(56) References Cited

U.S. PATENT DOCUMENTS

| | | | | |
|---|---|---|---|---|
| 2005/0128198 | A1* | 6/2005 | Kim | G06T 17/20 345/423 |
| 2007/0265727 | A1 | 11/2007 | Bae et al. | |
| 2011/0087350 | A1* | 4/2011 | Fogel | G06T 19/00 700/98 |
| 2013/0268085 | A1 | 10/2013 | Dong et al. | |
| 2014/0184599 | A1* | 7/2014 | Quilot | G06T 17/10 345/423 |
| 2015/0049085 | A1* | 2/2015 | Dysvik | G06T 17/20 345/424 |
| 2015/0190971 | A1 | 7/2015 | Musuvathy | |
| 2016/0133049 | A1* | 5/2016 | Hill | G06T 19/20 700/98 |
| 2018/0052947 | A1* | 2/2018 | Garcia-Reyero Vinas | G06F 30/00 |
| 2018/0086045 | A1* | 3/2018 | Morovic | B33Y 50/02 |
| 2019/0389133 | A1 | 12/2019 | Napadensky | |

FOREIGN PATENT DOCUMENTS

| | | |
|---|---|---|
| CN | 101404044 A | 4/2009 |
| CN | 102722622 A | 10/2012 |
| CN | 103530463 A | 1/2014 |
| CN | 103747943 A | 4/2014 |
| CN | 104361185 A | 2/2015 |
| CN | 104899359 A | 9/2015 |
| JP | 2001022961 A | 1/2001 |
| JP | 2003345837 A | 12/2003 |
| JP | 2005078416 A | 3/2005 |
| WO | 2011111900 A1 | 9/2011 |
| WO | WO2015106020 A1 | 7/2015 |

OTHER PUBLICATIONS

Simonovski et al. "Automatic parallel generation of finite element meshes for complex spatial structures", 2010. (Year: 2010).*
Biranchi Narayan Panda "Design and Development of Cellular Structures for Additive Manufacturing", 1-15. Jul. 1, 2015, XP055578014; Retrieved from the Internet URL:https://pdfs.semanticscholar.org/13a6/cb332f7ff94c8768c83ba9b75703839757bb.pdf.
DEstreaming: "A quick look at Autodesk Within", Youtube, Aug. 28, 2015, p. 1, XP054979276, Retrieved from the Internet URL:https://www.youtube.com/watch?v=stPbmGpvCuw.
European Search Report for European Patent Application No. 15909046.3-1224/3362921 dated Apr. 15, 2019.
PCT International Search Report and Written Opinion of the International Searching Authority dated Aug. 16, 2016, for corresponding PCT/CN2015/095572.
Chinese Office Action for Chinese Application No. 201580084093.3 dated Dec. 30, 2020.
Kenneth Wong; Shape Generator Makes its Debut in the Latest Autodesk Inventor Update; Digital Engineering 24/7, Oct. 16, 2015; pp. 1-7. https://www.digitalengineering247.com/article/generative-design-makes-its-debut-in-the-latest-autodesk-inventor-update/.
Yu Xiang, Niu Qiang, Liu Wei, Zhou Xiong-hui (National Die and Mold CAD Engineering Research Center, Shanghai Jiaotong University, Shanghai 200030, China); Free-Form Deformation for Reuse of Mesh Models of Finite Element Analysis; Journal of Shanghai Jiao Tong University vol. 49 No. 5, May 2015. pp. 1-5 with Abstract.

* cited by examiner

SYSTEM AND METHOD FOR MODELING OF PARTS WITH LATTICE STRUCTURES

The present patent document is a § 371 nationalization of PCT Application Serial Number PCT/CN2015/095572, filed Nov. 25, 2015, designating the United States, which is hereby incorporated by reference.

TECHNICAL FIELD

The present disclosure is directed, in general, to computer-aided design, visualization, and manufacturing systems ("CAD" systems), product lifecycle management ("PLM") systems, and similar systems, that manage data for products and other items (collectively, "Product Data Management" systems or PDM systems).

BACKGROUND

PDM systems manage PLM and other data. Improved systems are desirable.

SUMMARY

Various disclosed embodiments include systems and methods for modeling of parts with lattice structures and corresponding systems and computer-readable mediums. A method includes receiving a model of an object to be manufactured. The method includes receiving a user specification of a void region within the model to create a lattice. The method includes performing a trimming operation to create a trimmed lattice by tessellating void surfaces and grouping together at least one row of connected rods to be treated as a single entity.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 3E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Additive manufacturing enables making products with internal lattice structures, which are repeated arrangements of shapes in a grid-like pattern that replace a solid volume. Products with lattices demonstrate advantages in high structural strength with lower mass, enhanced cooling, vibration/acoustic/shock energy damping, orthopedic implant biointegration, and are therefore highly desirable in several applications spanning aerospace, automotive, power generation, industrial machinery and healthcare.

Before manufacturing parts containing lattices, it may be important to create computer-aided design (CAD) models of such products to visualize them, evaluate their physical properties such as weight, or analyze structural characteristics using finite element analysis (FEA) or related computer-aided engineering (CAE) analysis techniques. Then, once the part has been designed to meet functional and other design requirements, computer aided manufacturing systems are able to directly compute layer slices and toolpaths on the CAD models.

Commercial CAD systems lack sufficient support for creating lattice structures in a solid CAD model.

Disclosed embodiments include new shape data representations and methods required to create lattice structures, and perform modeling, simulation and manufacturing functions in a computationally efficient manner. Disclosed embodiments include a scalable lazy evaluation method for computer-aided design of parts with lattice structures.

Figure 1:
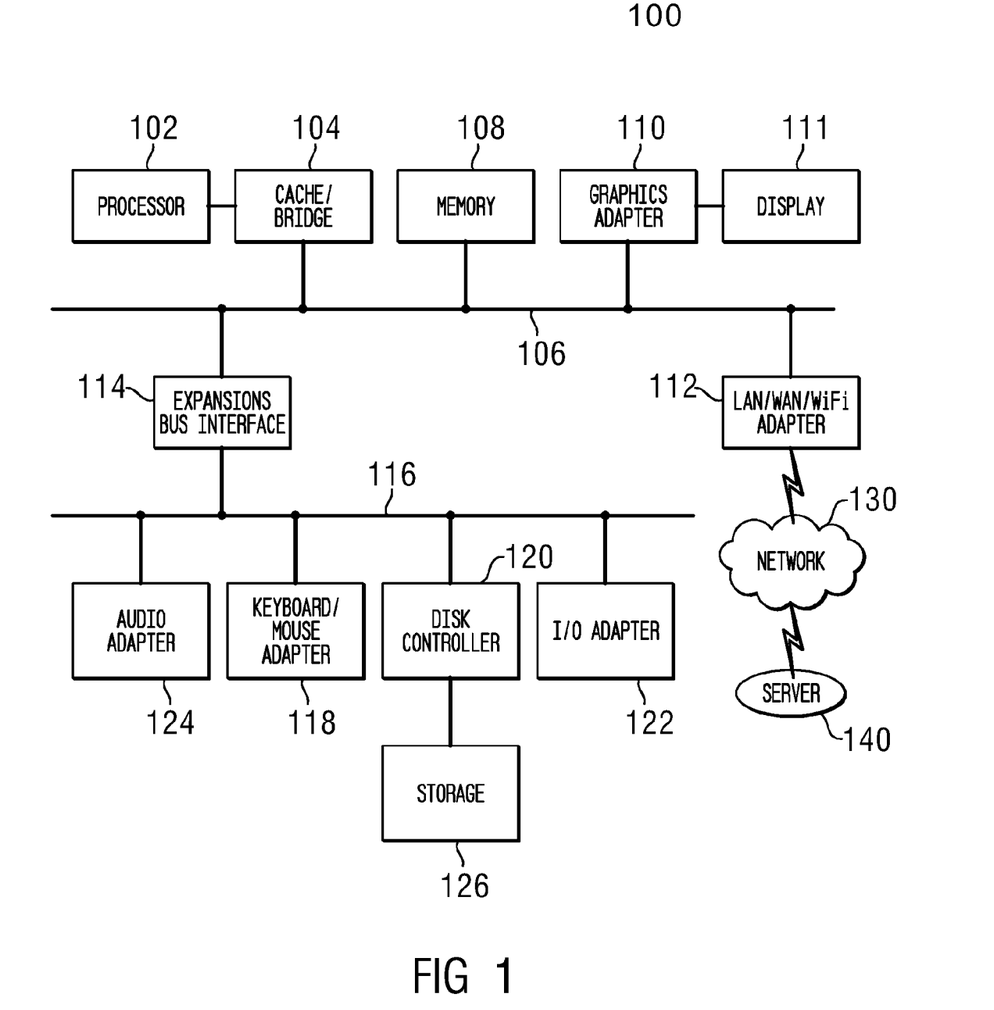
FIG. 1 illustrates a block diagram of a data processing system in which an embodiment may be implemented.

FIG. 1 illustrates a block diagram of a data processing system in which an embodiment may be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 may be connected to a storage 126, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track pointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/ WAN/Wireless adapter 112 may be connected to a network 130 (not a part of data processing system 100), which may be any public or private data processing system network or combination of networks, as known to those of skill in the art, including the Internet. Data processing system 100 may communicate over network 130 with server system 140, which is also not part of data processing system 100, but may be implemented, for example, as a separate data processing system 100.

Lattice modeling in commercial CAD systems may be done using native boundary representation (BRep) CAD functionality. Such methods suffer from numerous disadvantages, including but not limited to being computationally demanding and laborious. Independent commercial applications for lattice modeling exist but also suffer from numerous disadvantages, including but not limited to not being integrated with CAD systems which thereby limits their use in typical design processes. Polygonal based modeling, implicit surface-based modeling, and procedural modeling techniques have been presented in the academic literature but also suffer numerous drawbacks. For example, these techniques do not consider all the typical modeling functions that are required to create parts with lattices and focus only on specific aspects. None of these techniques address high density lattices, containing millions of lattice struts or elements, and are therefore not scalable.

Disclosed embodiments consider the rod lattice representation as defined by an arrangement of generalized cylindrical rods with optional spherical balls at the rod junctions. The shapes and cross-section sizes of the rods may be constant, defined by a user, defined by some function, or otherwise. The rod arrangements, in some embodiments, may be aligned according to a coordinate system that may be axis-aligned, cylindrical, spherical, and even warped.

Using techniques as disclosed herein, end users may create very high-density lattices including millions of rods. Fully instantiated representations of high density lattices would present significant challenges to a design system.

Disclosed embodiments include a system and method for designing parts with lattice structures wherein lattice geometry is instantiated only where needed (local instantiation) and when needed ("lazy" evaluation). The lattice itself is defined with a small set of parameters such as rod density (number of rods in a given direction), rod layout co-ordinate system (axis-aligned, cylindrical, etc.), and rod thicknesses.

The surfaces of all lattice rods may not be instantiated at the same time. Either the surfaces of only a small set of rods are instantiated, or an equivalent reduced order representation (e.g., lines for visualization, beam elements for FEA) for the rods are used in the computations.

The lattice is trimmed so that only the rods within the void region are considered for design and manufacturing.

In addition to trimming the lattices to desired sub-regions of a model, disclosed embodiments also include techniques for representative and modeling operations required for designing parts with lattices using the lazy evaluation approach, such as visualizing the trimmed lattices, computing mass properties such as weight, performing FEA, and performing computer-aided manufacturing operations such as slicing.

Figure 2:
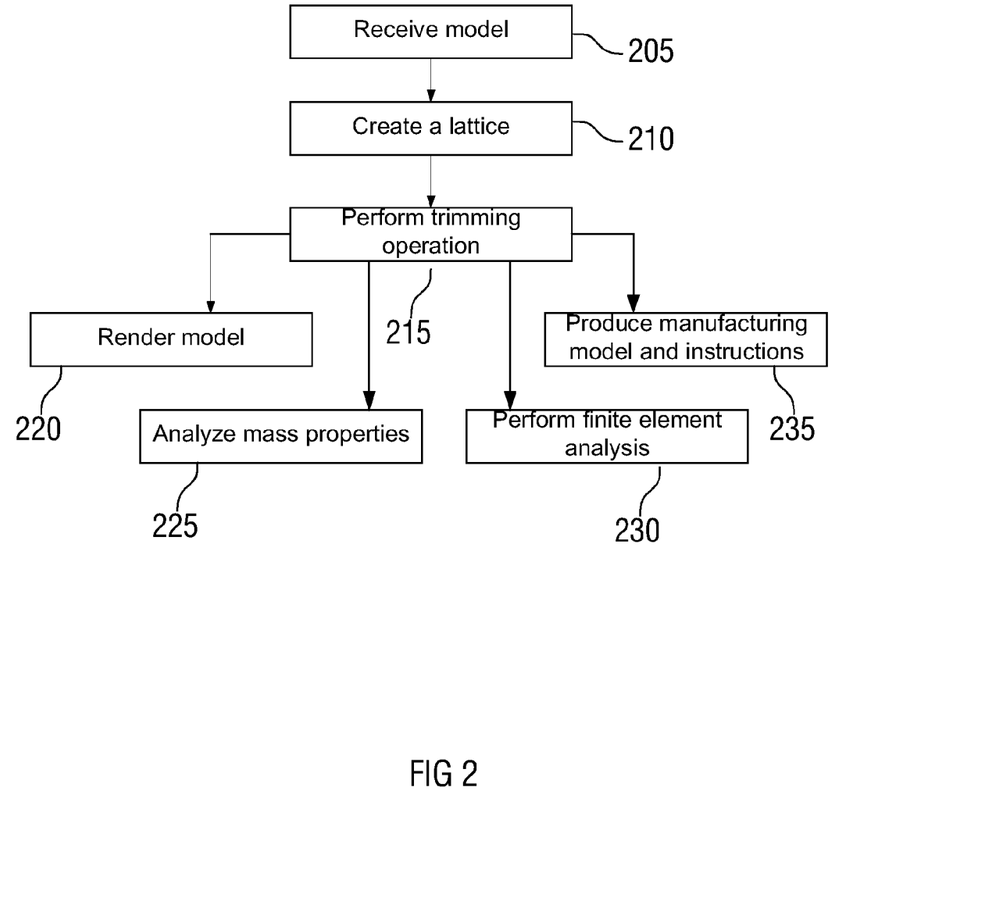
FIG. 2 illustrates a flowchart of a process in accordance with disclosed embodiments.

FIG. 2 illustrates a flowchart of a process in accordance with disclosed embodiments. FIGS. 3A-3E illustrate the acts used in creating a part with a lattice, in accordance with disclosed embodiments, and are used to illustrate the process of FIG. 2.

The process of FIG. 2 may be performed, for example, by a CAD, PDM, or other data processing system as described herein, referred to generically below as the "system." This process uses "lazy" evaluation techniques, as described herein, in one or more of the modeling functions.

The system receives a model of an object to be manufactured (205). In most cases, the object is to be manufactured using additive manufacturing techniques. Receiving, as used herein, may include loading from storage, receiving from another device or process, receiving via and interaction with a user, or otherwise.

Figure 3A:
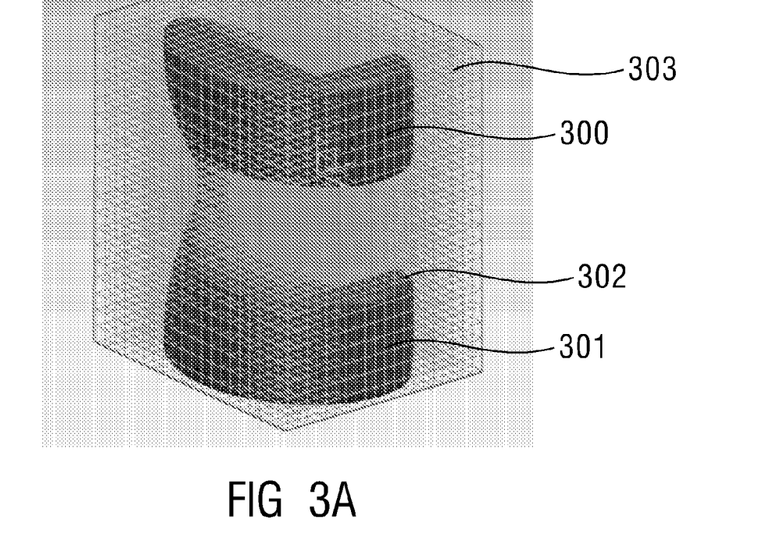
FIGS. 3A-3E illustrate the acts used in creating a part with a lattice, in accordance with disclosed embodiments.

The system receives a user specification within the model to create a lattice, as well as specifying other lattice parameters (210). This may be done by hollowing out a region within the model. This hollow region, termed the "void", will contain the lattice. FIG. 3A shows a part 300 with the lattice to be created inside the entire internal region with an axis aligned layout. The figure indicates that some of the lattice rods 301 lie inside the void, some rods 302 intersect the void surfaces and lie partially inside, and some rods 303 lie completely outside. The rods 303 lying outside are not relevant to the design while the others are. Classifying which of the rods lie completely inside and finding the intersection points with the void surfaces for those lying partially inside, is a computationally demanding problem that one of the embodiments solves. The system may create the lattice as a rod lattice representation defined by an arrangement of generalized cylindrical rods with optional spherical balls at the rod junctions.

The system performs a trimming operation (215). Trimming is a fundamental operation used in lattice modeling functions, and therefore its performance may be used for high density lattices.

The system tessellates the void surfaces to create a temporary triangle mesh representation. Additionally, the system creates an oct-tree representation of the triangle mesh to speed up trimming operation.

Then, instead of treating each rod segment independently, the system groups together an entire row of connected rods along a particular direction and treats them as a single entity. Among other advantages, this approach dramatically reduces computation time as well as memory consumption. An oct-tree based ray-mesh intersection algorithm may be used to determine which segments of the rods lie within the void. If necessary, the system may store the points of intersection between the lattice rods and the void surfaces. This would be used for instance in finite element analysis (FEA), to create suitable finite elements to connect with other finite elements belonging to the rest of the part.

The output of the lazy-evaluation based trimming operation is either a suitable geometry representation or information that may be used to perform core design and manufacturing operations on-the-fly without generating a complete geometric representation of the entire trimmed lattice. For example, the trimming operation may be used in core design functions including but not limited to visualization, mass property evaluation, finite element analysis, and manufacturing.

Figure 3B:
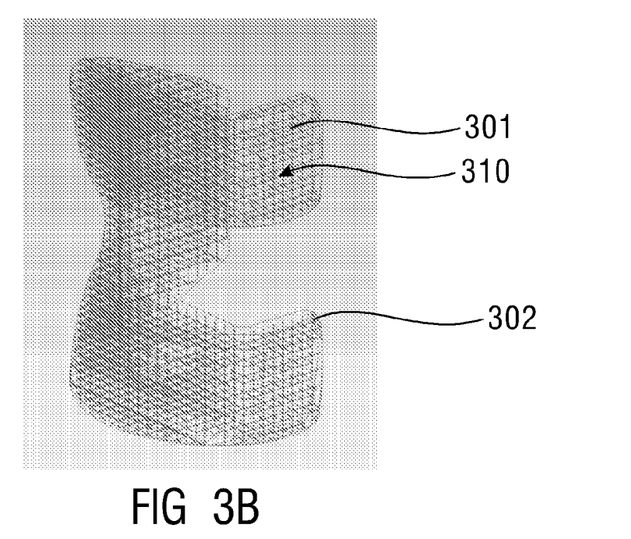

For example, the system renders the model (220). Rendering the lattice gives a designer key visual insight into the form of the part. Once trimming has performed, each segment of rods along a row lying in a void may be displayed as a single line segment. Furthermore, a subset of the lines within a given viewing volume may be shown to further improve visualization performance. FIG. 3B illustrates a rendering of a trimmed lattice 310. The figure shows the result of applying the computationally efficient algorithm to determine the rods 301 lying inside the void, and those 302 that lie partially inside, as they are relevant to the design. The figure also shows trimmed rods for those that lie partially inside, indicating computation of the intersection points of those rods with the void surfaces. For visualization, the trimmed rods are rendered as line segments.

In another embodiment, the system analyzes mass properties of the model or lattice (225). As part of this act, the system may perform mass property calculations. Mass properties such as volume and weight are important features of a part that may be inspected especially when a lattice feature is being used to reduce part weight.

As presented in the trimming operation, the system may tessellate the void's surfaces to create temporary triangle mesh representation. Additionally, the system may create an oct-tree representation of the triangle mesh to speed up trimming operation. The system may use the oct-tree based ray-mesh intersection algorithm on a row of rods to determine the relevant segments.

Then, volume/weight calculation may be interleaved with trimming as follows:

(a) For each segment, the system may compute the volume of the rod. When the rod has a constant radius, the volume is computed using the formula for a cylinder ($V=\pi*r^2*L$), where r is the radius of the rod and L is the length of the segment. When the rod has a variable cross-section, then the volume is computed by numerically executing the integral $\int A(1) \, dL$, where $A(1)$ is the cross section at position 1 and $0<=1<=L$, L is the length of the rod segment. This approach also allows for a cross section with a hole. Weight may be calculated as $V*d*g$, where V is the volume of the segment, d is the density of the material, and g is the gravitational constant.

(b) The system may repeat act (a) for each row of rods in the three co-ordinate directions. The system may then sum up the volume and weight to determine the properties of the entire lattice. In this approach, in various embodiments, the geometry of the lattice surfaces is never instantiated, and the trim end points of the rod segments are not stored, and therefore saves memory consumption for high density lattices.

In a different embodiment, the system performs a finite element analysis (FEA) on the model or lattice (230). FEA is used to analyze the behavior of the part under physical conditions. For example, structural analysis may be key in determining whether a part may withstand expected loads during operation. FEA in combination with weight calculation enables a designer to analyze strength-to-weight ratios when creating lightweight parts with lattices. FEA based topology optimization also facilitates the minimization of the lattice density.

The system may trim the lattice as abovementioned. The system may store all the trim end points of the rod segments lying inside the void region. Then, a reduced order FEM of the part with the lattice is created as follows:

(a) For each rod segment, the system may create 1-D beam elements with nodes at the individual rod ends as well as at the trim points on the part surfaces.

(b) The system may create a 3D tetrahedral (or equivalent) mesh of the surrounding void region (for e.g., a shell) such that the nodes from the trim end points in the 1-D model are included as nodes of some of the tetrahedral elements. This may be performed, for example, using a commercial software package such as the NX CAE software of Siemens Product Management Lifecycle Software Inc. (Plano, Tex.). This creates a conformal finite element model (FEM) of both the part and the lattice.

Figure 3C:
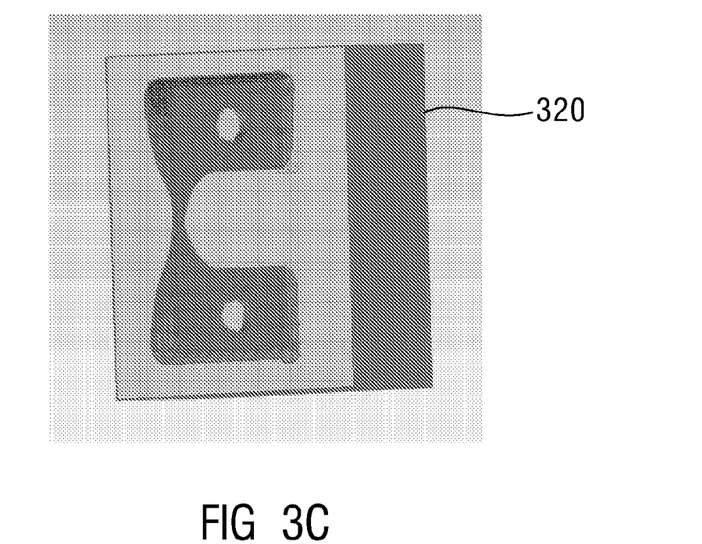
Figure 3D:
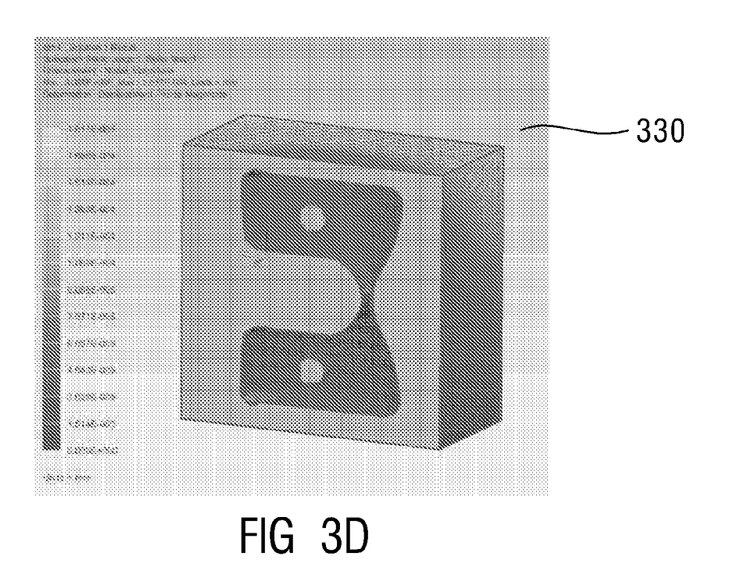

(c) The system may then perform FEA on the conformal FEM using standard CAE functions. FIG. 3C illustrates a finite element representation 320 of the lattice which is also conformally connected with the rest of the part. In one of the embodiment, the trimmed lattice rods computed are then converted into beam finite elements to perform FEA. FIG. 3D shows the result 330 of performing FEA on the part with lattice.

In another embodiment, the system produces a manufacturing model and instructions corresponding to the model and lattice (235). In order to fabricate the part with the lattice, one act is to compute intersections with slice planes, with each slice representing a layer of material to be deposited.

As abovementioned, the system may tessellate part surfaces to create temporary triangle mesh representation.

Additionally, the system may create an oct-tree representation of the triangle mesh. The system may use the oct-tree based ray-mesh intersection algorithm on a row of rods to determine the relevant segments. Then, the lazy evaluation approach for computing a single slice is as follows:

(a) For each segment, the system may determine if the end points lie on opposite sides of the slice plane. If they do, then instantiate a triangle mesh representation of the rod to represent the relevant rod segment and compute the intersection curve of the rod with the plane. If the two end points lie on the same side of the plane, check if any of the end points are at a distance close to the radius of the rod. If this condition is satisfied, then instantiate the rod and compute the intersection curve.

(b) The system may repeat act (a) for each row of rods in the three co-ordinate directions and store the intersection curves.

(c) Perform 2D Boolean unions of all the intersection curves on the slicing plane. This may be done either by direct geometric operations, or by rasterizing the slice into a binary image and extracting the edge curves.

(d) Compute tool paths on the slice and create G-code.

Figure 3E:
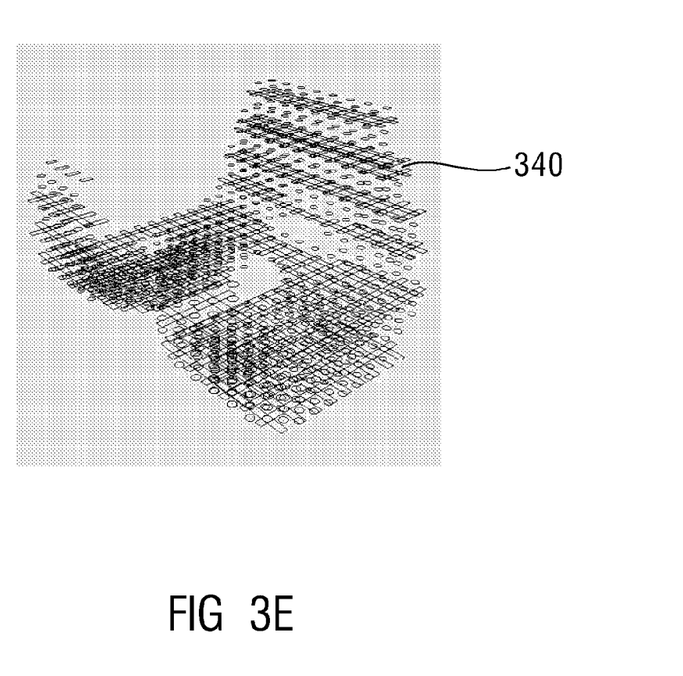

FIG. 3E illustrates creating layer slices 340 and generating manufacturing instructions. The figure shows the result of performing manufacturing processing operations on the part with the trimmed lattice. The trimmed rods are not stored, and rather the slicing is performed on the rods and the results of the slicing are used for generating manufacturing instructions.

Of course, those of skill in the art will recognize that, unless specifically indicated or required by the sequence of operations, certain acts in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, act, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A method for modeling of parts with lattice structures, the method performed by a data processor and comprising:
    receiving a model of an object to be manufactured;
    receiving a user specification of a void region within the model to create a lattice;
    performing a trimming operation to create a trimmed lattice by tessellating void surfaces and grouping together at least one row of a plurality of rods having a same direction connected via at least one rod junction along the same direction of the plurality of rods, wherein the at least one grouped row of the plurality of rods having the same direction connected via the at least one rod junction along the same direction of the plurality of rods is configured to be treated as a single entity; and
    analyzing, by the data processor, mass properties of the trimmed lattice by calculating a volume and a weight of each rod of the trimmed lattice.

2. The method of claim 1, further comprising:
    rendering the trimmed lattice by the data processor.

3. The method of claim 1, further comprising:
    creating, by the data processor, an oct-tree representation of a triangle mesh.

4. The method of claim 1, further comprising:
    analyzing, by the data processor, the mass properties of the trimmed lattice without instantiating surfaces of the trimmed lattice.

5. The method of claim 1, further comprising:
    performing, by the data processor, a finite element analysis on the model or the trimmed lattice.

6. The method of claim 5, wherein the data processor creates a conformal finite element model of a part and the trimmed lattice.

7. The method of claim 1, further comprising:
    producing, by the data processor, a manufacturing model and instructions corresponding to the model and the trimmed lattice.

8. The method of claim 7, further comprising:
    computing, by the data processor, intersections with slice planes, with each slice representing a layer of material to be deposited.

9. A data processing system comprising:
a processor; and
an accessible memory, wherein the data processing system is configured, with the processor and the accessible memory, to:
receive a model of an object to be manufactured;
receive a user specification of a void region within the model to create a lattice;
perform a trimming operation to create a trimmed lattice by tessellating void surfaces and grouping together at least one row of a plurality of rods having a same direction connected via at least one rod junction along the same direction of the plurality of rods, wherein the at least one grouped row of the plurality of rods having the same direction connected via the at least one rod junction along the same direction of the plurality of rods is configured to be treated as a single entity; and
analyze mass properties of the trimmed lattice by calculating a volume and a weight of each rod of the trimmed lattice.

10. The data processing system of claim 9, wherein the data processing system is further configured to render the trimmed lattice.

11. The data processing system of claim 9, wherein the data processing system is further configured to create an oct-tree representation of a triangle mesh.

12. The data processing system of claim 9, wherein the data processing system is further configured to analyze the mass properties of the trimmed lattice without instantiating surfaces of the trimmed lattice.

13. The data processing system of claim 9, wherein the data processing system is further configured to perform a finite element analysis on the model or the trimmed lattice.

14. The data processing system of claim 13, wherein the data processing system is further configured to create a conformal finite element model of a part and the trimmed lattice.

15. The data processing system of claim 9, wherein the data processing system is further configured to produce a manufacturing model and instructions corresponding to the model and the trimmed lattice.

16. A non-transitory computer-readable medium encoded with executable instructions that, when executed, cause one or more data processors to:
receive a model of an object to be manufactured;
receive a user specification of a void region within the model to create a lattice;
perform a trimming operation to create a trimmed lattice by tessellating void surfaces and grouping together at least one row of a plurality of rods having a same direction connected via at least one rod junction along the same direction of the plurality of rods, wherein the at least one grouped row of the plurality of rods having the same direction connected via the at least one rod junction along the same direction of the plurality of rods is configured to be treated as a single entity; and
analyze mass properties of the trimmed lattice by calculating a volume and a weight of each rod of the trimmed lattice.

* * * * *